United States Patent
Tei

(10) Patent No.: US 10,837,865 B2
(45) Date of Patent: Nov. 17, 2020

(54) WIRING METHOD OF OPTICAL FIBER, WIRING DEVICE OF OPTICAL FIBER, AND TRANSMISSION CHARACTERISTIC MEASUREMENT SYSTEM OF OPTICAL FIBER

(71) Applicant: SUMITOMO ELECTRIC INDUSTRIES, LTD., Osaka (JP)

(72) Inventor: Chonde Tei, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 40 days.

(21) Appl. No.: 16/311,247

(22) PCT Filed: Jun. 19, 2017

(86) PCT No.: PCT/JP2017/022526
§ 371 (c)(1),
(2) Date: Dec. 19, 2018

(87) PCT Pub. No.: WO2017/221890
PCT Pub. Date: Dec. 28, 2017

(65) Prior Publication Data
US 2019/0187024 A1    Jun. 20, 2019

(30) Foreign Application Priority Data
Jun. 20, 2016    (JP) .................. 2016-121873

(51) Int. Cl.
*G01M 11/00* (2006.01)
*G02B 6/46* (2006.01)
(Continued)

(52) U.S. Cl.
CPC ............ *G01M 11/33* (2013.01); *G01M 11/00* (2013.01); *G02B 6/46* (2013.01); *G02B 6/3608* (2013.01); *G02B 6/4457* (2013.01)

(58) Field of Classification Search
CPC ...... G02B 6/46; G02B 6/3608; G02B 6/4457; G02B 6/255; G02B 6/42; G01M 11/00;
(Continued)

(56) References Cited

U.S. PATENT DOCUMENTS 5,142,661 A * 8/1992 Grant .................. G02B 6/3801
385/135
5,241,617 A * 8/1993 Peacock ............... G02B 6/4453
385/135
(Continued)

FOREIGN PATENT DOCUMENTS

JP    2003-515143 A    4/2003
JP    2006-519419 A    8/2006
(Continued)

*Primary Examiner* — Sang H Nguyen
(74) *Attorney, Agent, or Firm* — Faegre Drinker Biddle & Reath LLP

(57) ABSTRACT

A wiring method of an optical fiber in a curved shape includes disposing a first guide member which guides the optical fiber on an outer peripheral side of a wiring path of the curved shape of the optical fiber, and imparting a predetermined bending to the optical fiber by bringing the optical fiber into contact with the first guide member.

6 Claims, 4 Drawing Sheets

(51) Int. Cl.
*G02B 6/44* (2006.01)
*G02B 6/36* (2006.01)

(58) Field of Classification Search
CPC ....... G01M 11/33; H04B 10/40; H04B 10/61; H04B 10/611
See application file for complete search history.

(56) References Cited

U.S. PATENT DOCUMENTS

| | | | | |
|---|---|---|---|---|
| 5,647,045 | A * | 7/1997 | Robinson | G02B 6/4454 385/135 |
| 6,424,783 | B1 * | 7/2002 | Hara | G02B 6/4457 385/135 |
| 6,586,673 | B1 * | 7/2003 | Socarras | H02G 3/30 174/481 |
| 7,113,686 | B2 * | 9/2006 | Bellekens | G02B 6/4454 385/134 |
| 2012/0230643 | A1 * | 9/2012 | Izuhara | G02B 6/4457 385/135 |
| 2013/0074311 | A1 * | 3/2013 | Vastmans | G02B 6/4454 29/450 |
| 2014/0126871 | A1 * | 5/2014 | Kanayama | G02B 6/4457 385/135 |
| 2014/0348478 | A1 * | 11/2014 | Isenhour | G02B 6/4236 385/135 |
| 2014/0378797 | A1 * | 12/2014 | Hendriks | A61B 5/1459 600/342 |
| 2016/0124171 | A1 * | 5/2016 | Takahashi | G02B 6/4457 385/134 |
| 2017/0299830 | A1 * | 10/2017 | Kokura | G02B 6/44 |
| 2018/0156974 | A1 * | 6/2018 | Minota | G02B 6/4261 |

FOREIGN PATENT DOCUMENTS

| | | |
|---|---|---|
| JP | 2007-279217 A | 10/2007 |
| JP | 2008-107586 A | 5/2008 |
| JP | 2009-156849 A | 7/2009 |
| WO | WO-01/37009 A2 | 5/2001 |
| WO | WO-2004/079423 A1 | 9/2004 |

* cited by examiner

WIRING METHOD OF OPTICAL FIBER, WIRING DEVICE OF OPTICAL FIBER, AND TRANSMISSION CHARACTERISTIC MEASUREMENT SYSTEM OF OPTICAL FIBER

TECHNICAL FIELD

The present invention relates to a wiring method of an optical fiber, a wiring device of the optical fiber, and a transmission characteristic measurement system of the optical fiber.

BACKGROUND ART

This application is based upon and claims the benefit of priority from Japanese Patent Application No. 2016-121873, filed on Jun. 20, 2016, the entire contents of which are incorporated herein by reference.

Patent Literature 1 discloses a method and a device for automating a test of an optical fiber, which includes a conveyor. The conveyor is automated such that a spool wound with the optical fiber thereon is moved from a test station to a test station.

Patent Literature 2 discloses a method of bending the optical fiber to measure an optical characteristic and a mechanical characteristic of the optical fiber, in which the optical fiber is inserted in a bendable tube and the bendable tube is bent in an annular shape to bend the optical fiber.

CITATION LIST

Patent Literature

[Patent Literature 1] JP-A-2003-515143
[Patent Literature 2] JP-A-2009-156849

SUMMARY OF THE INVENTION

Solution to Problem

A wiring method of an optical fiber in a curved shape according to the invention includes disposing a first guide member which guides the optical fiber on an outer peripheral side of a wiring path of the curved shape of the optical fiber, and imparting a predetermined bending to the optical fiber by bringing the optical fiber into contact with the first guide member.

A wiring device of an optical fiber which wires an optical fiber in a curved shape according to the invention includes a pedestal, and a guide member which is disposed on the pedestal. The guide member includes a circular wall which erects from the pedestal. An opening is formed in a part of the wall.

A transmission characteristic measurement system of an optical fiber which receives light incident on one end of an optical fiber and receives light output from another end of the optical fiber according to the invention includes a light source which outputs the light and makes the light incident on the one end of the optical fiber, a light receiving unit which receives the light output from the other end of the optical fiber, and a guide mechanism which wires the optical fiber by feeding the optical fiber from one end of the first guide member disposed on an outer peripheral side of a curved wiring path of the optical fiber, and couples the one end of the optical fiber to the light source and the other end of the optical fiber to the light receiving unit.

DESCRIPTION OF EMBODIMENTS

Technical Problem

Figure 1:
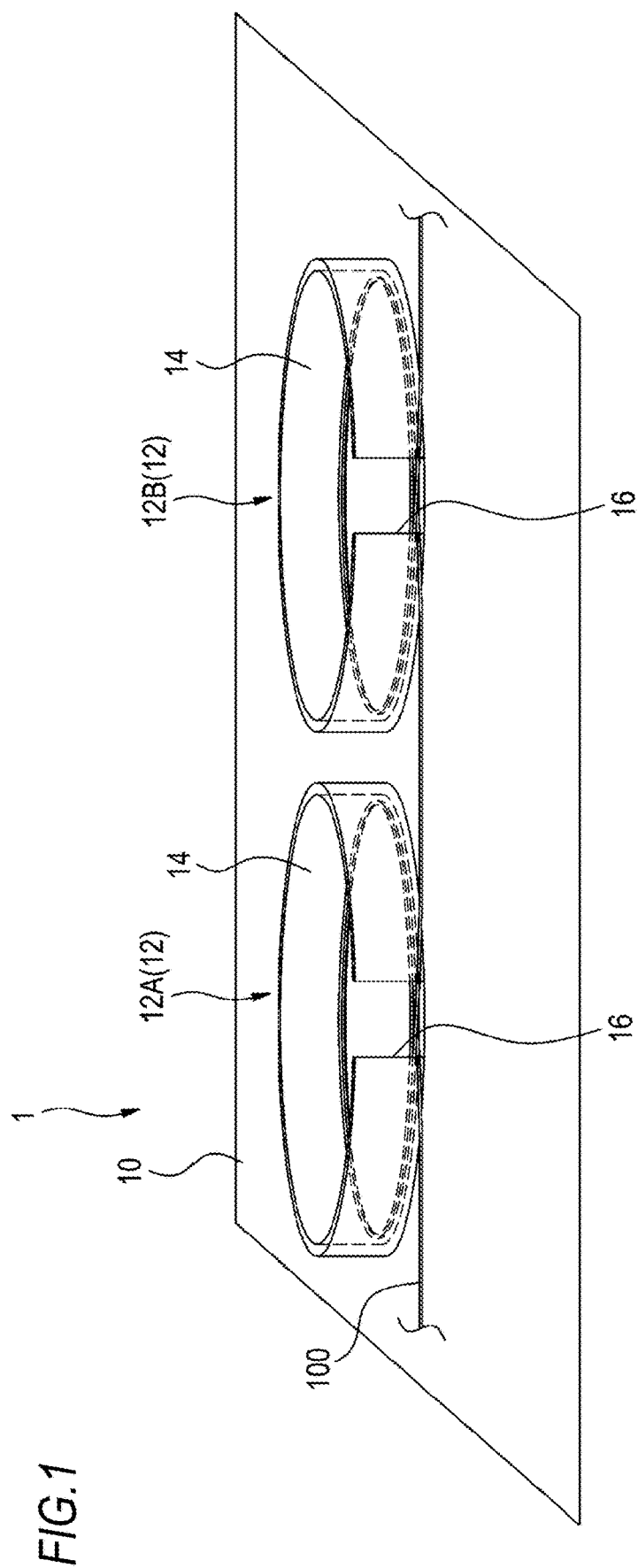
FIG. 1 is a perspective view illustrating an example of a wiring device for performing a wiring method of an optical fiber according to a first embodiment of the present invention.

In Patent Literature 1, when a light source and a light receiving unit which are measurement tools are located linearly, the optical fiber can be wired easily. However, when there is an object between the light source and the light receiving unit to necessarily bypass the optical fiber, the optical fiber is hard to appropriately be wired. There is a need to apply bending on the optical fiber at the time of measuring according to a measurement item of the optical fiber. However, when the bending is applied on the optical fiber through the tube as disclosed in Patent Literature 2, the tube may be deformed due to the degradation of the tube so as to cause the optical fiber to be pressed partially. Further, when the tube is bent in an annular shape, the optical fiber is extended and applied with a lateral pressure. Also, the optical fiber in the tube is deformed, and there is a possibility to cause an error in the bending radius.

The present invention is to provide a wiring method of an optical fiber, a wiring device of the optical fiber, and a transmission characteristic measurement system of the optical fiber which can be wired in a desired curved shape without causing a lateral pressure on the optical fiber.

Advantageous Effects of the Invention

According to the invention, it is possible to provide an optical fiber, a wiring device of the optical fiber, and a transmission characteristic measurement system of the optical fiber which can be wired in a desired curved shape without causing a lateral pressure on the optical fiber.

Description of Embodiments of this Application

First, the embodiments of the invention will be described. A wiring method of the optical fiber according to the embodiment of the invention is as follows.

(1) A wiring method of the optical fiber in a curved shape includes disposing a first guide member which guides the optical fiber on an outer peripheral side of a wiring path of the curved shape of the optical fiber, and imparting a predetermined bending to the optical fiber by bringing the optical fiber into contact with the first guide member.

According to this configuration, the guide member is fixed to the outer peripheral side of the wiring path so that the optical fiber is neither pressed nor extended. Therefore, it is possible to provide a wiring method of an optical fiber which can be wired in a desired bending radius without causing a lateral pressure on the optical fiber.

(2) The first guide member may be formed in a curved shape corresponding to the wiring path of the curved shape, or in a polygonal shape circumscribed to the wiring path. According to this configuration, the optical fiber can be wired in a curved shape with a simple configuration.

(3) A second guide member of a curved shape may be disposed along the wiring path on an inner peripheral side of the wiring path of the curved shape.

According to this configuration, the optical fiber can be appropriately bent in a desired bending radius.

(4) The optical fiber may be wired by feeding the optical fiber from one end of the first guide member.

According to this configuration, the optical fiber can be wired in a predetermined curved shape by sequentially feeding the fiber from one end of the first guide member.

A wiring device of the optical fiber according to the embodiment of the invention is as follows.

(5) A wiring device of an optical fiber which wires an optical fiber in a curved shape includes a pedestal, and a guide member which is disposed on the pedestal. The guide member includes a circular wall which erects from the pedestal. An opening is formed in a part of the wall.

According to this configuration, it is possible to provide a wiring device of the optical fiber which can be wired in a desired curved shape without causing a lateral pressure on the optical fiber.

A transmission characteristic measurement system of the optical fiber according to the embodiment of the invention as follows.

(6) A transmission characteristic measurement system of an optical fiber which receives light incident on one end of an optical fiber and receives light output from another end of the optical fiber includes a light source which outputs the light and makes the light incident on the one end of the optical fiber, a light receiving unit which receives the light output from the other end of the optical fiber, and a guide mechanism which wires the optical fiber by feeding the optical fiber from one end of the first guide member disposed on an outer peripheral side of a curved wiring path of the optical fiber, and couples the one end of the optical fiber to the light source and the other end of the optical fiber to the light receiving unit.

According to this configuration, it is possible to provide a transmission characteristic measurement system of the optical fiber which can be appropriately wired without causing a lateral pressure on the optical fiber between the light source and the light receiving unit.

DETAILED DESCRIPTION OF EMBODIMENTS

Hereinafter, embodiments of a wiring method of an optical fiber, a wiring device of the optical fiber, and a transmission characteristic measurement system of the optical fiber according to the invention will be described with reference to the drawings.

First Embodiment

Figure 2:
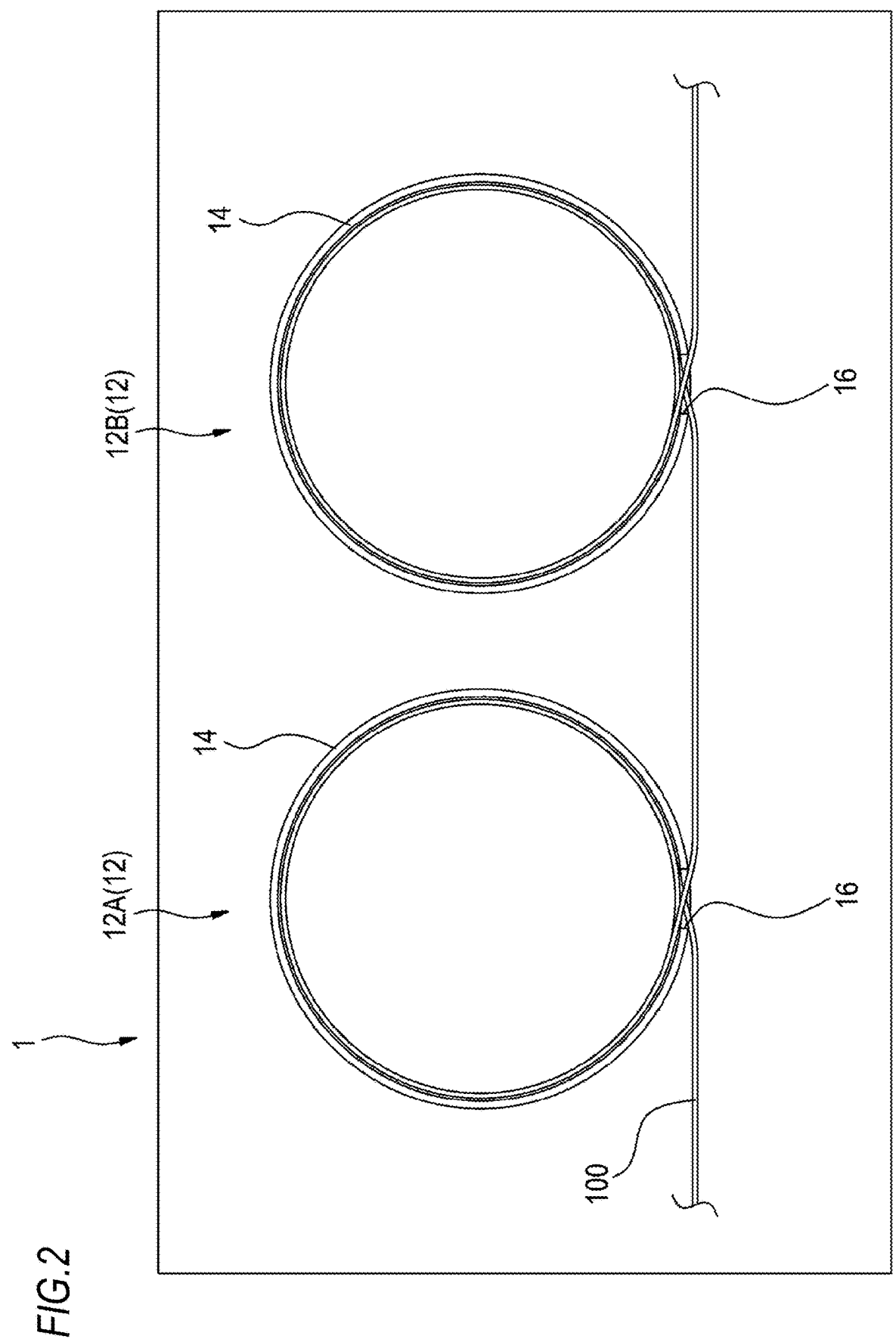
FIG. 2 is a top view of the wiring device illustrated in FIG. 1.

FIG. 1 is a perspective view illustrating an example of the wiring device for performing a wiring method of an optical fiber according to a first embodiment of the invention. FIG. 2 is a top view of the wiring device illustrated in FIG. 1.

A wiring device 1 according to this embodiment is, for example, a device which is used to measure a characteristic (optical characteristic and mechanical characteristic) with respect to the bending of an optical fiber 100. As illustrated in FIGS. 1 and 2, the wiring device 1 includes a pedestal 10 and a guide member 12 (an example of the first guide member) disposed on the pedestal 10. In this example, two guide members 12A and 12B are disposed in parallel on the pedestal 10 as the guide member 12. However, only one guide member 12 may be provided. The guide member 12 is configured by a circular wall 14 which is erected from the pedestal 10. That is, the guide member 12 is formed in a hollow shape in which a storage space of the optical fiber 100 is included. An opening 16 is formed by partially cutting the wall 14.

When the optical fiber 100 is wired using the wiring device 1, a user firstly feeds the optical fiber 100 into the hollow guide member 12 from the opening 16 which is formed in part of the wall 14. The optical fiber 100 fed into the guide member 12 abuts on part of the inner periphery of the wall 14 of which the tip end is formed in a circular shape. When the user further feeds the optical fiber 100 from the rear side from the tip end to the front side in this state, the optical fiber 100 is widened to the outer side by the rigidity thereof. Therefore, the optical fiber 100 comes into contact with the wall 14 along the inner periphery of the wall 14 to be bent, and the tip end returns toward the opening 16. Thereafter, the user winds the optical fiber 100 by a predetermined number of times along the inner periphery of the wall 14 (twice in FIG. 1), and derives the optical fiber 100 from the opening 16 to the outer portion of the guide member 12 again. As illustrated in FIG. 1, when there are a plurality of guide members 12A and 12B on the pedestal 10, the user feeds the optical fiber 100 derived from the guide member 12A from the opening 16 of the guide member 12B into the guide member 12B, and winds the optical fiber 100 along the inner periphery of the wall 14.

In this way, the guide member 12 which guides the optical fiber 100 is disposed on the outer side of the curved wiring path of the optical fiber 100 in the wiring method of the optical fiber using the wiring device 1 of this embodiment. The optical fiber 100 is brought into contact with the guide member 12, and a predetermined bending is imparted to the optical fiber 100. With this configuration, the optical fiber 100 can be wired at the predetermined bending radius by a method as simple as the optical fiber 100 is fed from one end of the opening 16 of the guide member 12. Further, it is possible to improve a work efficiency at the time of measuring the optical fiber. At this time, the optical fiber 100 is widened by its own rigidity to be brought into contact with the wall 14 of the guide member 12. Therefore, no additional pressure is applied to the optical fiber 100. The wall 14 of the guide member 12 is formed to have a predetermined bending radius to accurately wind the optical fiber 100 without errors.

As a material of the surface of the guide member 12, it is preferable to use one which is rigid and hard to be worn so that the optical fiber 100 can be easily wired and the shape does not change within time. For example, metal, glass, ceramics, and rigid plastic are preferable, and carbon and rubber are not preferable. For example, a V-shaped groove may be provided along the longitudinal direction of the optical fiber 100 at a position where the optical fiber 100 of the surface (the inner surface of the wall 14) of the guide member 12 to guide the optical fiber 100 along the surface (inner surface) of the guide member 12.

Modifications

Figure 3:
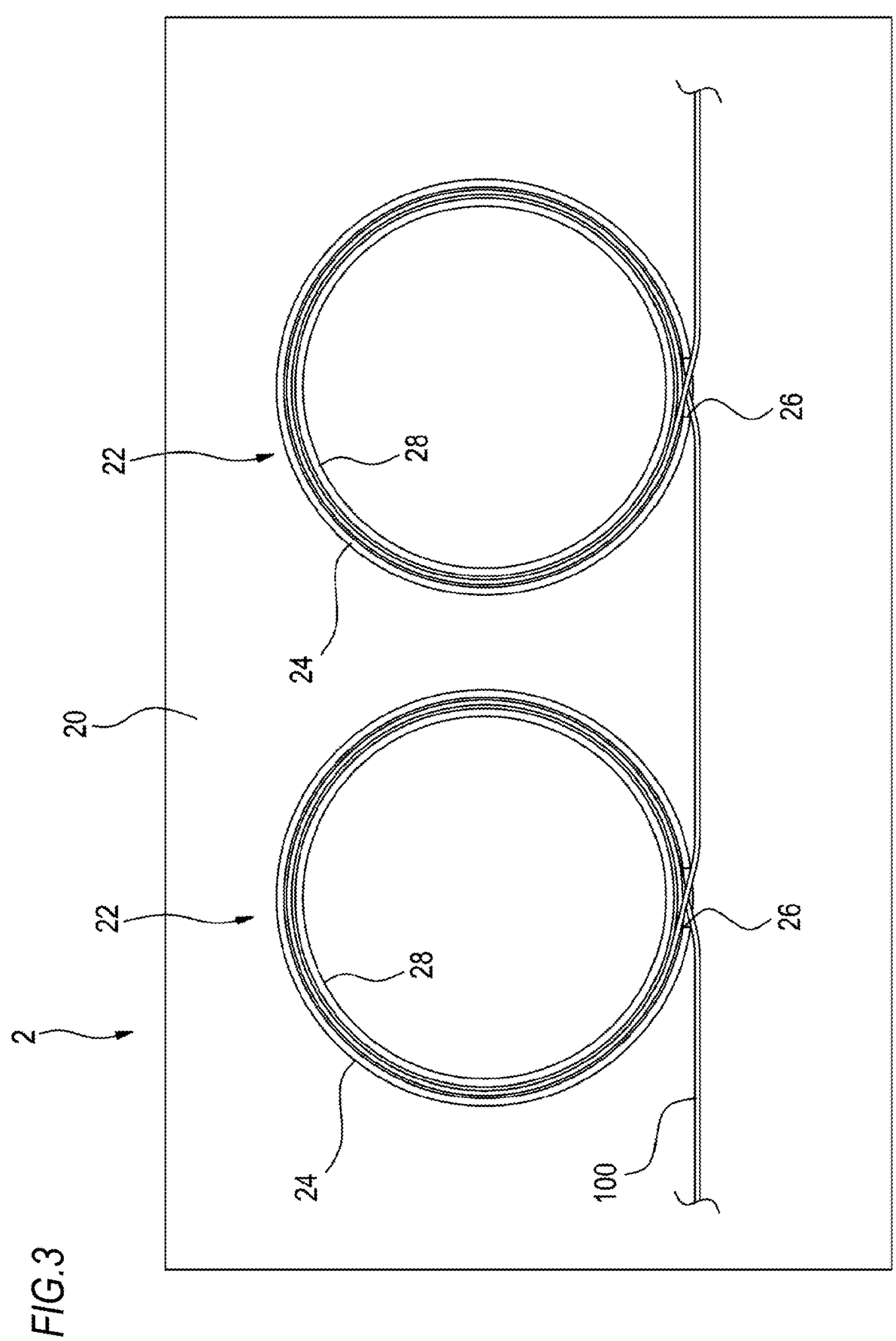
FIG. 3 is a top view illustrating a modification example of the wiring device of FIG. 1.

FIG. 3 is a top view illustrating a modification example of the wiring device 1 according to the first embodiment. A wiring device 2 according to this modification includes a pedestal 20, and a guide member 22 which is erected on the pedestal 20. The guide member 22 includes a circular outer wall 24 which has an opening 26, and an inner wall 28 (an example of the second guide member) which is disposed on an inner peripheral side of the outer wall 24. The inner wall 28 is formed in a curved shape corresponding to the curved shape of the outer wall 24, and is provided with a predetermined gap with respect to the outer wall 24. A separation distance between the inner wall 28 and the outer wall 24 desirably falls within a range from 0.5 mm or more to 5 mm or less. When the wiring is made at the predetermined bending radius to measure a transmission characteristic such as bending loss, it is desirable to form the separation distance small because an error in the bending radius becomes small. A feeding force of the optical fiber 100 becomes strong when the separation distance is less than 0.5 mm, and the optical fiber 100 can be easily fed. When there is no need of accuracy in the bending radius, the optical fiber 100 is easily fed when the separation distance is large. However, if the separation distance exceeds 5 mm, the effect of the inner wall 28 is reduced.

Even in this modification, the optical fiber 100 is fed from the opening 26 of the guide member 22. The optical fiber 100 fed from the opening 26 into the guide member 22 is wound by a predetermined number of times through a space formed between the outer wall 24 and the inner wall 28, and is derived from the opening 26 to the outside of the guide member 22 again. With this configuration, the optical fiber 100 is guided even to the inner peripheral side by the inner wall 28. Therefore, the optical fiber 100 can be bent at a desired bending radius more appropriately.

Second Embodiment

Figure 4:
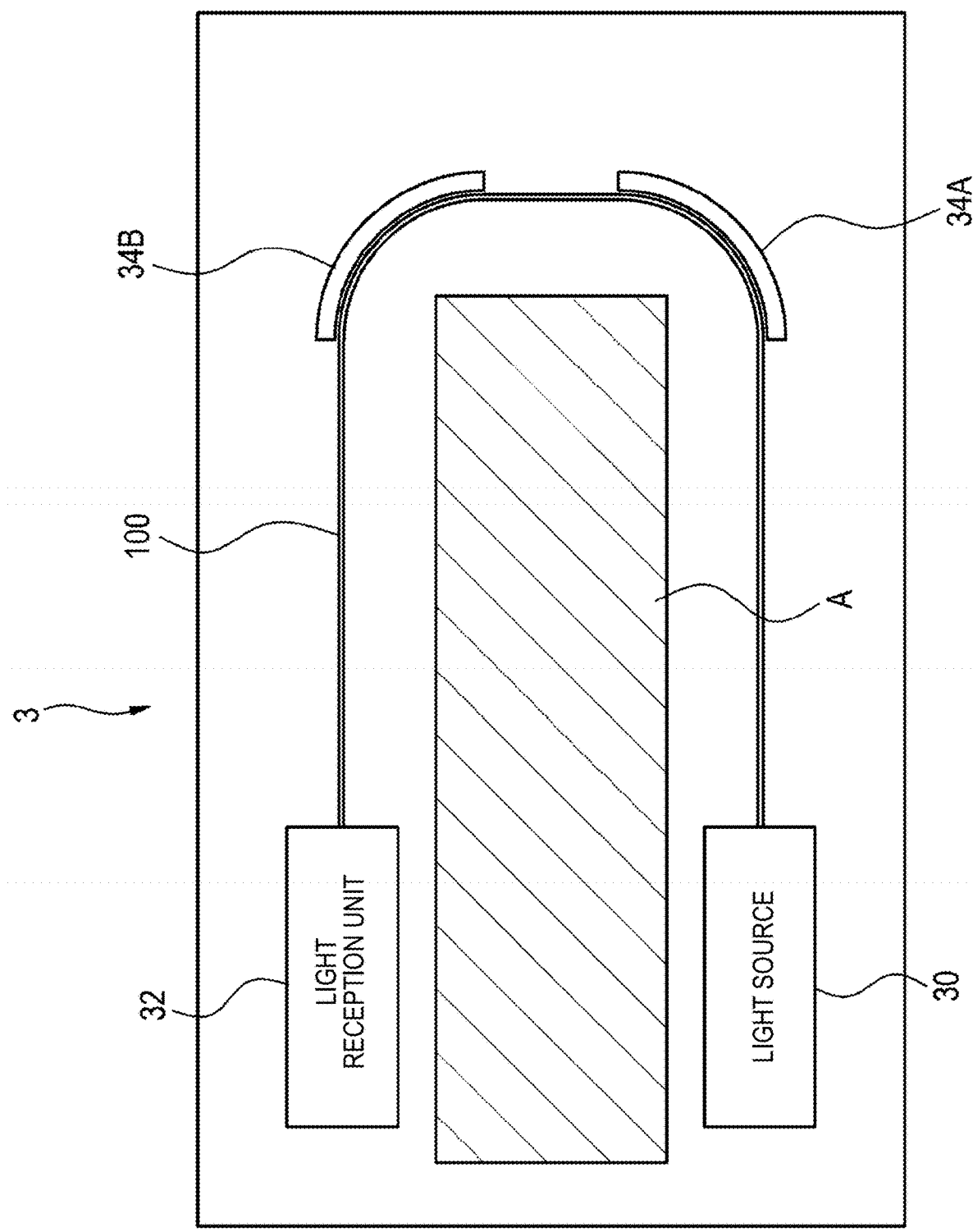
FIG. 4 is a diagram illustrating a configuration of a transmission characteristic measurement system of an optical fiber according to a second embodiment of the invention.

FIG. 4 is a diagram illustrating a configuration of the transmission characteristic measurement system of the optical fiber according to a second embodiment. A transmission characteristic measurement system 3 of the optical fiber is a system to measure the transmission characteristic of the optical fiber 100 by receiving light incident on one end of the optical fiber 100 and by emitting the light through the other end of the optical fiber 100. As illustrated in FIG. 4, the transmission characteristic measurement system 3 includes a light source 30 which emits and makes the light incident on one end of the optical fiber 100, and a light receiving unit 32 which receives the light emitted from the other end of the optical fiber 100. On the other hand, as an example of the component, the optical fiber may be not linearly wired between the light source 30 and the light receiving unit 32 in the transmission characteristic measurement system 3. As illustrated in FIG. 4, there is disposed an object A which is required between the light source 30 and the light receiving unit 32 for the transmission characteristic measurement system 3. Therefore, it is not possible to linearly wire the optical fiber 100 between the light source 30 and the light receiving unit 32, and is necessary to wire the object A through bypassing.

Then, the measurement system 3 according to this embodiment, there are disposed guide members 34A and 34B in an arc shape at positions facing the corners of the object A. The guide members 34A and 34B are walls which erect from the floor of the measurement system 3, are provided on the outer peripheral side of the curved wiring path of the optical fiber 100. The tip end of the optical fiber 100 abuts on the inner peripheral surfaces of the guide members 34A and 34B and are bent to change the wiring direction of the optical fiber 100 to a predetermined direction. As illustrated in FIG. 4, one end of the optical fiber 100 is coupled to the light source 30 in the measurement system 3. The optical fiber 100 is brought into contact along the inner peripheral surface of the guide member 34A from one end side of the guide member 34A to change the direction of the optical fiber 100 by about 90 degrees. Further, the optical fiber 100 is brought into contact along the inner peripheral surface of the guide member 34B from one end side of the guide member 34B to change the direction of the optical fiber 100 by about 90 degrees so that the other end of the optical fiber 100 is coupled to the light receiving unit 32. In this way, the optical fiber 100 is wired along the inner peripheral surfaces of the are guide members 34A and 34B so that the optical fiber 100 can be wired in a predetermined curved shape to bypass the object A. That is, the wiring direction (wiring path) of the optical fiber 100 can be changed freely using the arc guide members 34A and 34B. Therefore, the flexibility in arrangement of the light source 30 and the light receiving unit 32 can be increased according to the situation of a place where the transmission characteristic measurement system 3 is provided. Further, the optical fiber 100 can be wired automatically in this example. In other words, as an example, a feeding device of the optical fiber 100 is disposed in front of the guide member 34A to send the optical fiber 100 toward the guide member 34A. Thus, the optical fiber 100 may be automatically wired in a desired path and coupled to the light receiving unit 32.

The invention has been described with reference to the specific embodiments in detail. However, various modifications and changes may be added within a scope not departing from the spirit of the invention.

For example, the circular guide members 12 and 22 of the first embodiment may be formed by linking a plurality of the arc guide members 34A and 34B used in the second embodiment. In the above embodiments, the guide members 12, 22, 34A, and 34B are formed in a curved shape corresponding to the wired optical fiber 100.

However, the guide members may be formed in a polygonal shape circumscribed to the optical fiber 100. Even in this case, the optical fiber can be wired in a curved shape by making the optical fiber go along the guide portion.

REFERENCE SIGNS LIST 1, 2: wiring device
3: transmission characteristic measurement system
10: pedestal
12: guide member (first guide member)
14: wall
16: opening
22: guide member
24: outer wall
28: inner wall (second guide member)
30: light source
32: light receiving unit
34A, 34B: guide member
100: optical fiber

The invention claimed is:

1. A wiring method of an optical fiber in a curved shape, comprising:
 disposing a first guide member which guides the optical fiber on an outer peripheral side of a wiring path of the curved shape of the optical fiber, the first guide member including a circular wall which has an opening;
 disposing a second guide member having a curved shape along the wiring path on an inner peripheral side of the wiring path of the curved shape, the second guide member including a circular wall which is disposed on an inner peripheral side of the first guide member so that a separation distance between the circular wall of the first guide member and the circular wall of the second guide member falls within a range from 0.5 mm or more to 5 mm or less; and imparting a predetermined bending to the optical fiber by bringing the optical fiber into contact with the first guide member.

2. The wiring method of the optical fiber according to claim 1, wherein the first guide member is formed in a curved shape corresponding to the wiring path of the curved shape, or in a polygonal shape circumscribed to the wiring path.

3. The wiring method of the optical fiber according to claim 2, wherein the optical fiber is wired by feeding the optical fiber from one end of the first guide member.

4. The wiring method of the optical fiber according to claim 1, wherein the optical fiber is wired by feeding the optical fiber from one end of the first guide member.

5. A transmission characteristic measurement system of an optical fiber which receives light incident on one end of an optical fiber and receives light output from another end of the optical fiber, comprising:

a light source for outputting the light and making the light incident on the one end of the optical fiber;

a light receiving unit for receiving the light output from the other end of the optical fiber; and a guide mechanism for wiring the optical fiber in the wiring method according to claim 4, and coupling the one end of the optical fiber to the light source and the other end of the optical fiber to the light receiving unit.

6. A wiring device of an optical fiber which wires an optical fiber in a curved shape, comprising:

a pedestal, a first guide member which is disposed on the pedestal, and a second guide member which has a curved shape and is disposed on an inner peripheral side of the first guide member, wherein the first guide member includes a circular wall which erects from the pedestal on an outer peripheral side of a wiring path of the curved shape, the second guide member includes a circular wall disposed on an inner peripheral side of the wiring path of the curved shape, an opening is formed in a part of the wall of the first guide member, and a separation distance between the wall of the first guide member and the wall of the second guide member falls within a range from 0.5 mm or more to 5 mm or less.

* * * * *